(12) United States Patent  
Gregory

(10) Patent No.: US 8,490,614 B1  
(45) Date of Patent: Jul. 23, 2013

(54) RESIDENTIAL FLAME BROILER

(76) Inventor: Michael S. Gregory, Highlands Ranch, CO (US)

( * ) Notice: Subject to any disclaimer, the term of this patent is extended or adjusted under 35 U.S.C. 154(b) by 1346 days.

(21) Appl. No.: 12/283,791

(22) Filed: Sep. 15, 2008

Related U.S. Application Data

(60) Provisional application No. 60/993,352, filed on Sep. 13, 2007.

(51) Int. Cl.
*A47J 37/00* (2006.01)

(52) U.S. Cl.
USPC ....... 126/41 R; 126/1 R; 126/37 R; 126/19 M

(58) Field of Classification Search
USPC ............... 126/1 R, 26 R, 8, 37 R, 37 B, 41 R, 126/41 D, 41 E, 39 B, 20.1, 20.2, 19 M, 273 R, 126/506, 348, 369.2, 369.3; 99/448, 449
See application file for complete search history.

(56) References Cited

U.S. PATENT DOCUMENTS

| | | | |
|---|---|---|---|
| 2,920,177 A | | 1/1960 | Brane |
| 3,601,037 A | | 4/1971 | Giaretta |
| 3,982,096 A | | 9/1976 | Dills |
| D245,162 S | | 7/1977 | Zimmer |
| 4,598,634 A | | 7/1986 | Van Horn, II |
| 4,605,840 A | * | 8/1986 | Koopman ..................... 219/401 |
| 4,936,286 A | | 6/1990 | Baker |
| 4,972,766 A | | 11/1990 | Anetsberger |
| 5,184,599 A | * | 2/1993 | Stuart .......................... 126/25 R |
| 5,197,377 A | | 3/1993 | Jennings et al. |
| 5,216,947 A | * | 6/1993 | Cheng .............................. 99/417 |
| 5,279,277 A | * | 1/1994 | Barker ......................... 126/41 R |
| 5,473,979 A | * | 12/1995 | Ruben .............................. 99/446 |
| 5,485,816 A | * | 1/1996 | Cox et al. ..................... 126/25 R |
| 5,706,796 A | * | 1/1998 | Genero ......................... 126/21 R |
| 5,711,209 A | * | 1/1998 | Guines ............................. 99/339 |
| 5,724,886 A | * | 3/1998 | Ewald et al. .................... 99/374 |
| 5,727,451 A | | 3/1998 | DeMars |
| 5,891,498 A | * | 4/1999 | Boehler ......................... 426/314 |
| 6,041,695 A | * | 3/2000 | Kuopus ............................ 99/428 |
| 6,116,150 A | * | 9/2000 | Greenfield, Jr. ................ 99/332 |
| 6,363,835 B1 | | 4/2002 | Wu |
| 6,382,085 B1 | | 5/2002 | Dotan |
| 6,606,986 B2 | * | 8/2003 | Holland et al. ............. 126/25 R |
| 7,150,278 B1 | * | 12/2006 | Hampton ........................ 126/38 |
| 7,638,736 B2 | * | 12/2009 | Adamczak et al. ........... 219/401 |
| 7,832,390 B2 | * | 11/2010 | Hsu et al. ......................... 126/36 |
| 7,861,705 B2 | * | 1/2011 | Hulsey ........................ 126/25 A |
| 2007/0163568 A1 | * | 7/2007 | Murray et al. .................. 126/50 |
| 2008/0066733 A1 | * | 3/2008 | Wahl et al. .................. 126/25 R |

* cited by examiner

*Primary Examiner* — Linda Dvorak
*Assistant Examiner* — Jocelyn D Ram
(74) *Attorney, Agent, or Firm* — Montgomery Patent & Design; Robert C. Montgomery

(57) ABSTRACT

The invention discloses a gas grill with multiple enhancements to allow for easy grilling of foods, subsequent cleanup, and replacement of parts. In lieu of a top-opening lid, the apparatus provides a plurality of removable and insertable drawers, comprising a plurality of burner units, a plurality of grill trays, and a drip tray located in a vertical configuration therein a base unit. All drawers are interchangeable as desired. A storage compartment is located on the bottom directly below the drip tray and an exhaust assembly is located on the top for directing smoke away from the apparatus. The invention is adaptable to propane or natural gas. Additional drawers and burner assemblies are provided and may be used for charcoal or wood burning, bun or food warming, and water steaming. All drawers are easily removable on slides with a safety catch system for easy care and cleaning.

16 Claims, 5 Drawing Sheets

RESIDENTIAL FLAME BROILER

RELATED APPLICATIONS

The present invention was first described in and claims the benefit of U.S. Provisional Patent Application No. 60/993,352 filed on, Sep. 13, 2007.

FIELD OF THE INVENTION

The present invention relates generally to a portable cooking apparatus comprising a plurality of cooking drawers and a plurality of burner units each insertable therein a portable base unit, further comprising an auxiliary tray, a top warmer, a storage compartment, a fuel access compartment, fuel line plumbing, burner unit controls, and an exhaust stack with a removable and washable filter.

BACKGROUND OF THE INVENTION

Outdoor grills produce great tasting food in a minimum of time. These grills, unfortunately, are not without their disadvantages. First, the heat source is only available on the bottom, which forces the user to flip the foods to ensure even cooking. Secondly, one must deal with flare-ups when flipping, basting or otherwise attending to the food, which often results in substandard preparation. Third, such grills are difficult to keep clean due to their all in one design. Finally, burner access, whether for repair, or changeover from natural gas to propane is difficult as well. Accordingly, there exists a need for a means by which grills can be modified in their design to address these shortcomings. The development of the invention herein described fulfills this need.

Many people when grilling outside are sickened by the smoke that emanates from a conventional grill. Likewise, the heat can also be overwhelming and uncomfortable to a user. The invention herein described reduces the exposure of the user to smoke and heat that emanates from the invention due to its self-contained nature.

U.S. Pat. No. D 245,162 issued to Zimmer discloses a circular food oven. Unfortunately, this design patent does not appear to disclose an apparatus similar in appearance to the described invention nor does it appear to possess a plurality of drawers or burners trays adaptable to natural gas or propane.

U.S. Pat. No. 6,382,085 issued to Dotan discloses a cooking appliance that is able to function as a toaster oven, a broiler, a rotisserie utilizing horizontally mounted electrical members that can be pre-set to vary cooking times and temperatures. Unfortunately, this patent does not appear to describe a natural gas- or propane-fired cooking appliance that comprises a plurality of drawers and burner trays for easily cooking or broiling foodstuffs nor does it appear to describe an appliance with a self-contained drip tray.

U.S. Pat. No. 6,363,835 issued to Wu discloses a two-piece electric grill device that encompasses a foodstuff placed upon the lower surface. Unfortunately, this patent does not appear to disclose a cooking appliance that comprises a plurality of drawers and burners mounted vertically on its body to provide various cooking surfaces for foodstuffs placed therein.

U.S. Pat. No. 5,727,451 issued to DeMars discloses a broiler apparatus that appears to be a conveyor mounted cooking device utilized in mass food producing operations. Unfortunately, this patent does not appear to disclose an appliance useful for residential domestic operation nor does it appear to disclose a natural gas- or propane-fired cooking appliance that comprises a plurality of drawers and burners mounted thereon.

U.S. Pat. No. 5,197,377 issued to Jennings et al. discloses an apparatus for two-sided cooking that appears to be bayonet styled heating elements that are hingedly connected to a grill surface and that rest upon a foodstuff to be cooked. Unfortunately, this patent does not appear to disclose a natural gas- or propane-fired vertical cooking appliance comprising a plurality of drawers and burners that are self-contained, easily cleaned and capture grease drippings.

U.S. Pat. No. 4,972,766 issued to Anetsburger discloses a cooking grill with two different heating platens that may be placed on two sides of a foodstuff to be cooked. Unfortunately, this patent does not appear to disclose a propane- or natural gas-fired cooking appliance comprising a plurality of vertically mounted drawers and burners that are easily cleaned and self-contained.

U.S. Pat. No. 4,936,286 issued to Baker discloses a gas fired broiler possessing a plurality of burners adjacent to multiple conveyor belts. Unfortunately, this patent does not appear to disclose an appliance useful for residential domestic operation nor does it appear to disclose a natural gas- or propane-fired cooking appliance that comprises a plurality of drawers and burners mounted thereon.

U.S. Pat. No. 4,598,634 issued to Van Horn discloses portable broiler and griddle that may be placed on top of the burners of a cooking stove to convert a range into a broiler or a griddle for frying. Unfortunately, this patent does not appear to disclose an appliance that comprises a plurality of vertically arranged self contained drawers and burners that easily cleaned.

U.S. Pat. No. 3,982,096 issued to Dills discloses an electric baking oven with an upper broiling element and a lower baking element. Unfortunately, this patent does not appear to disclose a natural gas- or propane-fired vertical cooking appliance comprising a plurality of drawers and burners that are self-contained, easily cleaned and capture grease drippings.

U.S. Pat. No. 3,601,037 issued to Giaretta discloses a circular revolving broiler for cooking meat on both sides that comprises a broiler mechanism and fire bricks arranged within the appliance. Unfortunately, this patent does not appear to disclose a natural gas- or propane-fired cooking appliance that comprises a plurality of drawers and burner trays for easily cooking or broiling foodstuffs nor does it appear to describe an appliance with a self-contained drip tray.

U.S. Pat. No. 2,920,177 issued to Brane discloses a circular broiler apparatus. Unfortunately, this patent does not appear to disclose an appliance that comprises a plurality of vertically arranged self-contained drawers and burners that are easily cleaned.

SUMMARY OF THE INVENTION

In view of the foregoing disadvantages in the prior art, it has been observed that there is a need for a residential flame broiler which provides a gas grill with multiple enhancements to allow for the easy grilling of foods, subsequent clean-up, and replacement of parts.

An object of the residential flame broiler comprises a plurality of removable and configurable modular drawers including a drip tray, a bottom burner, a grill surface, all of which are arranged in a vertical drawer configuration.

Another object of the residential flame broiler comprises modular drawers that may be removed from the frame enclosure for cleaning.

Yet still another object of the residential flame burner is to provide an effective top and bottom cooking means to food via a burner assembly, a grill surface assembly insertable therein a drawer opening thereof the residential flame burner.

Still another object of the residential flame broiler is a grill surface assembly that is mounted in such a manner that the grill surface assembly may be withdrawn from the frame of the broiler for placement of foodstuffs thereon and for cleaning.

A further object of the residential flame broiler is a drip tray assembly located at a bottom drawer opening to capture grease and other drippings thereby aiding in clean-up of the broiler.

Still a further object of the residential flame broiler is a storage compartment that is used for storage of barbecuing tools, supplies, food preparation aids, food, and similar items.

Yet another object of the residential flame broiler is that the broiler is adaptable to propane or natural gas as a fuel source.

Yet another object of the residential flame broiler is an ignition button to easily ignite the broiler without the need for an extraneous ignition source such as a lighter or matches.

Yet a further object of the residential flame broiler is a fuel tank that provides gas for the broiler and that is housed within the residential flame broiler.

Another object of the residential flame broiler is an exhaust system to filter and direct smoke away from an operator using a filter and a fan.

Yet still another object of the residential flame broiler is a filter that may be slidably removed from the broiler for cleaning.

Still yet another object of the residential flame broiler is a top warmer assembly conveniently located on the frame top surface to toast and warm buns and other foodstuffs.

Still a further object of the residential flame broiler is an auxiliary surface area that provides work area and an area for placement of articles and foodstuffs.

Another object of the residential flame broiler comprises a plurality of hooks attached to the auxiliary surface area upon which grilling and cooking tools may be hung.

Yet still another object of the residential flame broiler comprises four (4) heavy-duty casters located on the bottom of the broiler that support and permit the broiler to be moved.

Yet a further object of the residential flame broiler comprises a smoker assembly that may be used for charcoal or wood burning, and water steaming.

An aspect of the residential flame broiler comprises a frame enclosure, a grill surface assembly, a burner assembly, a drip tray assembly, a bun toaster/warmer assembly, an exhaust assembly, tracks, casters, storage compartment doors, an igniter, igniter wire, igniter buttons, an auxiliary surface, support brackets and electrical power connectors.

Another aspect of the residential flame broiler comprises a frame enclosure made of structural steel and covered with sheet steel further comprising a frame front panel, a frame top panel, and a pair of frame side panels.

A further aspect of the residential flame broiler comprises a frame enclosure that sits upon a storage compartment accessed by a set of storage compartment doors. Each storage compartment door comprises a handle and a pair of hinges. The storage compartment is insulated from the heat generating conditions of the frame enclosure by an insulating barrier.

Yet another aspect of the residential flame broiler comprises a frame front panel of the frame enclosure further comprising a plurality of modular access drawers including a burner assembly, a grill surface assembly, and a drip tray assembly. Each modular access drawer is of identical height and comprises a handle to open and close the drawer. Said modular access drawers are supported by a sliding track mechanism. The burner assembly, grill surface assembly, and drip tray assembly may be interchangeable therein a desired drawer opening.

Still another aspect of the residential flame broiler comprises a track mechanism that allows for complete extension of each modular access drawer outwardly from the frame enclosure for purposes of cleaning, food insertion, food removal, maintenance, and the interchanging of drawers. The track mechanism comprises a means for each drawer to be completely separated and lifted free of the frame enclosure.

Still a further aspect of the residential flame broiler comprises a sliding track mechanism further comprising a locking mechanism which prevents the over extension of the sliding track mechanism and inadvertent dislodgement of a modular access drawer from the frame enclosure.

A further aspect of the residential flame broiler comprises a gas control panel comprising ignition buttons and gas control knobs that controls a flow of gas to the burner assemblies. The gas control panel is located subjacent to the drip tray. The gas control knobs comprise conventional panel-mounted proportional valve units controlling a flow of gas to a network of gas plumbing.

Still a further aspect of the residential flame broiler comprises a reflector shield and a reflector shield support rod. The uppermost drawer opening can support a burner assembly that is located directly above the grill surface assembly. The burner assembly works with a reflector shield positioned directly above and comprises a polished reflective metal surface to effectively radiate heat from the burner assembly downward to foodstuffs located thereupon the grill grate. The reflector shield is mounted to opposing side frame panels of the frame enclosure by a pair of reflector support rods.

Yet another aspect of the residential flame broiler comprises a grill surface assembly comprising a grill grate, a grill face plate, and a pair of grill side panels. The grill surface assembly provides for the grilling and/or barbecuing of foods. The grill grate further comprises a two-layer matrix of parallel welded steel rods. Further, the grill grate may be introduced as a solid metal surface being suitable for cooking various foodstuffs not suitable for a grate-type surface.

Yet still a further aspect of the residential flame broiler comprises a burner assembly comprising a plurality of male gas connectors and said residential flame broiler comprising a plurality of female gas connectors, latching knobs, latching receivers, a burner support rod, a burner face plate, a handle, and two burner side panels.

Still another aspect of the residential flame broiler comprises a burner assembly having three (3) burner zones, each controlled by a separate burner control knob. The burner face plate provides an attachment means to the frame enclosure by a pair of latching knurled knobs and corresponding latching receivers.

Yet another aspect of the residential flame broiler comprises matching gas connectors for the gas needs of the associated modular access drawers. The gas connectors comprise a quick connect feature that automatically connects when the modular access drawer is fully inserted into the frame compartment via the sliding track mechanism.

Still another aspect of the residential flame broiler comprises a drip tray assembly located in the bottommost position of the described invention comprising a drip tray face plate, a removable flat drip tray, a pair of drip tray side panels, and a drip tray rear panel. The drip tray assembly receives grease, oil and other discarded substances from said upper modular drawers.

Still a further aspect of the residential flame broiler comprises a top warmer assembly comprising a top warmer lid, an open top warmer grate, a second handle and a plurality of second hinges. The top warmer assembly is provided at the top of the apparatus to provide access to an area that toasts or warms buns, serve as an auxiliary cooking surface, and hold food that has already been cooked by the apparatus.

Another aspect of the residential flame broiler comprises an exhaust assembly comprising a 110-volt power fan, a stack, a stack hood, a plenum, a filter, a third handle and a power cord. The exhaust assembly permits smoke to exhaust via the powered fan above the height of a typical user. The weather stack hood prevents entry of foreign matter into the vent stack.

A further aspect of the residential flame broiler further comprises a fuel tank hose, a fuel tank connector, a natural gas connector, gas piping, a gas distribution box, a gas control knob, a gas valve, a fuel tank access door, a fourth handle, hinges, and a fuel tank.

Still another aspect of the residential flame broiler is an auxiliary surface area, supported by a pair of collapsible support brackets that is located along the frame side panel of the frame enclosure. The auxiliary surface further comprises a plurality of hooks along an outer edge region for hanging utensils and towels.

Yet another aspect of the residential flame broiler comprises a smoker assembly further comprising a wood/water tray, hanging brackets, support plates, a smoker grate, a smoker face plate, two smoker side panels and a smoker rear panel.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY

Figure 1:
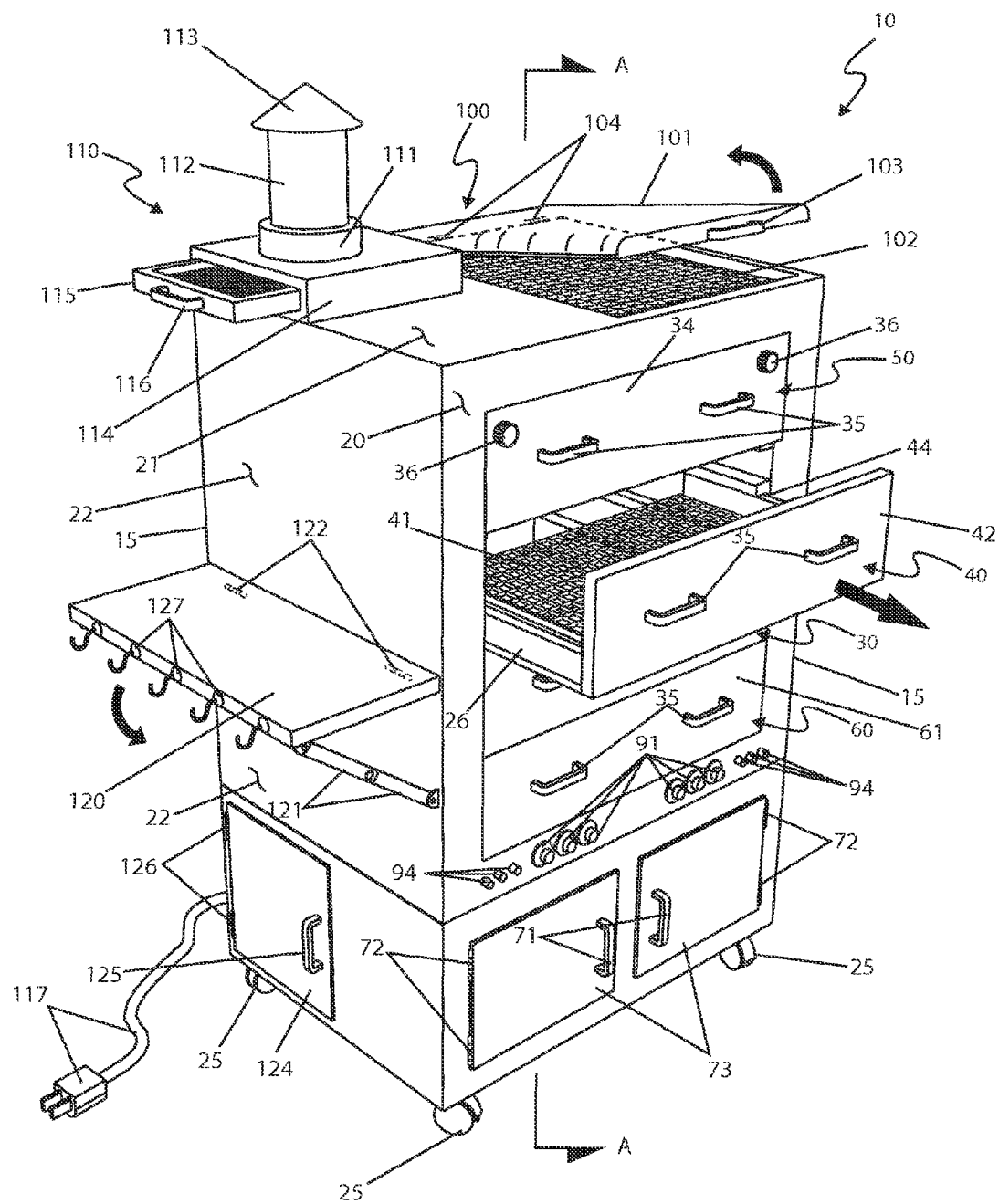
FIG. 1 is a front perspective view of a residential flame broiler 10, according to the preferred embodiment of the present invention.

| 10 | residential flame broiler |
|---|---|
| 15 | frame enclosure |
| 17 | ventilation slot |
| 19 | frame rear panel |
| 20 | frame front panel |
| 21 | frame top panel |
| 22 | frame side panel |
| 23 | female track feature |

-continued

| 24 | threaded receiver |
|---|---|
| 25 | caster |
| 26 | male track feature |
| 27 | locking mechanism |
| 30 | lower burner assembly |
| 31 | burner loop |
| 32 | male gas connector |
| 33 | burner support rod |
| 34 | burner face plate |
| 35 | first handle |
| 36 | threaded knurled knob |
| 37 | burner side panel |
| 40 | grill surface assembly |
| 41 | grill grate |
| 42 | grill face plate |
| 44 | grill side panel |
| 50 | upper burner assembly |
| 51 | reflector shield |
| 52 | reflector support rod |
| 60 | drip tray assembly |
| 61 | drip tray face plate |
| 62 | drip tray |
| 63 | drip tray side panel |
| 64 | drip tray rear panel |
| 70 | storage compartment |
| 71 | second handle |
| 72 | first hinge |
| 73 | storage compartment doors |
| 81 | female gas connector |
| 83 | gas piping |
| 84 | gas manifold |
| 85 | gas regulator |
| 86 | propane tank hose |
| 87 | propane tank connector |
| 88 | natural gas connector |
| 90 | control panel |
| 91 | gas control knob |
| 92 | igniter wire |
| 93 | igniter |
| 94 | igniter button |
| 95 | gas valve |
| 96 | insulating layer |
| 100 | top warmer assembly |
| 101 | top warmer lid |
| 102 | top warmer grate |
| 103 | second handle |
| 104 | second hinge |
| 110 | exhaust assembly |
| 111 | power fan |
| 112 | stack |
| 113 | stack hood |
| 114 | plenum |
| 115 | filter |
| 116 | third handle |
| 117 | power cord |
| 120 | auxiliary surface |
| 121 | support bracket |
| 122 | third hinge |
| 124 | propane tank access door |
| 125 | fourth handle |
| 126 | fourth hinge |
| 127 | hook |
| 130 | smoker assembly |
| 131 | wood/water tray |
| 132 | hanging bracket |
| 133 | support plate |
| 134 | smoker grate |
| 135 | smoker face plate |
| 136 | smoker side panel |
| 137 | smoker rear panel |
| 200 | food stuffs |
| 210 | propane tank |

DETAILED DESCRIPTION OF THE PREFERRED EMBODIMENT

The best mode for carrying out the invention is presented in terms of its preferred embodiment, herein depicted within FIGS. 1 through 5 and in terms of its alternate embodiment depicted in FIG. 4. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a residential flame broiler (herein described as the "apparatus") 10, which provides a gas grill with multiple enhancements to allow for easy grilling of foods, subsequent clean-up, and replacement of parts. In addition to a top-opening bun toaster/warmer lid 101, the apparatus 10 provides a series of removable and configurable drawers including a drip tray assembly 60, a lower burner assembly 30, a grill surface assembly 40, and an upper burner assembly 50, all arranged in a vertical drawer configuration. The apparatus 10 further comprises a lower storage compartment 70 and an exhaust system 110 to filter and direct smoke away from an operator. Both burner assemblies 30, 50 are adaptable to propane or natural gas. An additional interchangeable smoker assembly 130 is provided and may be used for charcoal or wood burning, and water steaming. All drawers are easily removable for easy care and cleaning.

Referring now to FIG. 1, a front perspective view of the apparatus 10 according to the preferred embodiment of the present invention is disclosed. The apparatus 10 comprises a frame enclosure 15 made of structural stainless steel shapes and covered with sheet stainless steel similar to that of a conventional backyard barbecue grill comprising a frame front panel 20, a frame top panel 21, and a pair of frame side panels 22. The frame front panel portion 20 of the frame enclosure 15 comprises an upper and lower burner assemblies 30, 50 inserted into a lower location and an upper location, respectively, a grill surface assembly 40, and a drip tray assembly 60 (see FIG. 5). The primary material of construction used to build said drawer portions is envisioned to be stainless steel. Each assembly 30, 40, 50, 60 is of identical height approximately six (6) to ten (10) inches tall and is opened and closed by use of a pair of first handles 35. Each assembly 30, 40, 50, 60 is supported by a sliding track mechanism comprising a female track feature 23 located on opposing side panels 22 of the frame 15 and a male track feature 26 located on outer surfaces of the burner side panels 37 (see FIG. 2). The apparatus 10 provides an effective top and bottom cooking means to foodstuffs 200 via a lower burner assembly 30, a grill surface assembly 40 and an upper burner assembly 50. The lower burner assembly 30 is located immediately above the drip tray assembly 60. The burner surface of the lower burner assembly 30 would cover the complete horizontal area (see FIG. 2). The grill surface assembly 40 comprises a grill grate 41, a grill face plate 42, and a pair of grill side panels 44. The grill surface assembly 40 provides for the grilling and/or barbecuing of foods. The grill grate 41 further comprises a two-layer matrix of parallel welded steel rods arranged approximately one-half (½) to one (1) inch apart being capable of withstanding anticipated temperatures; however, it is also envisioned that the grill grate 41 may be introduced as a solid metal surface being suitable for cooking various food stuffs 200 not suitable for a grate-type surface.

Figure 2:
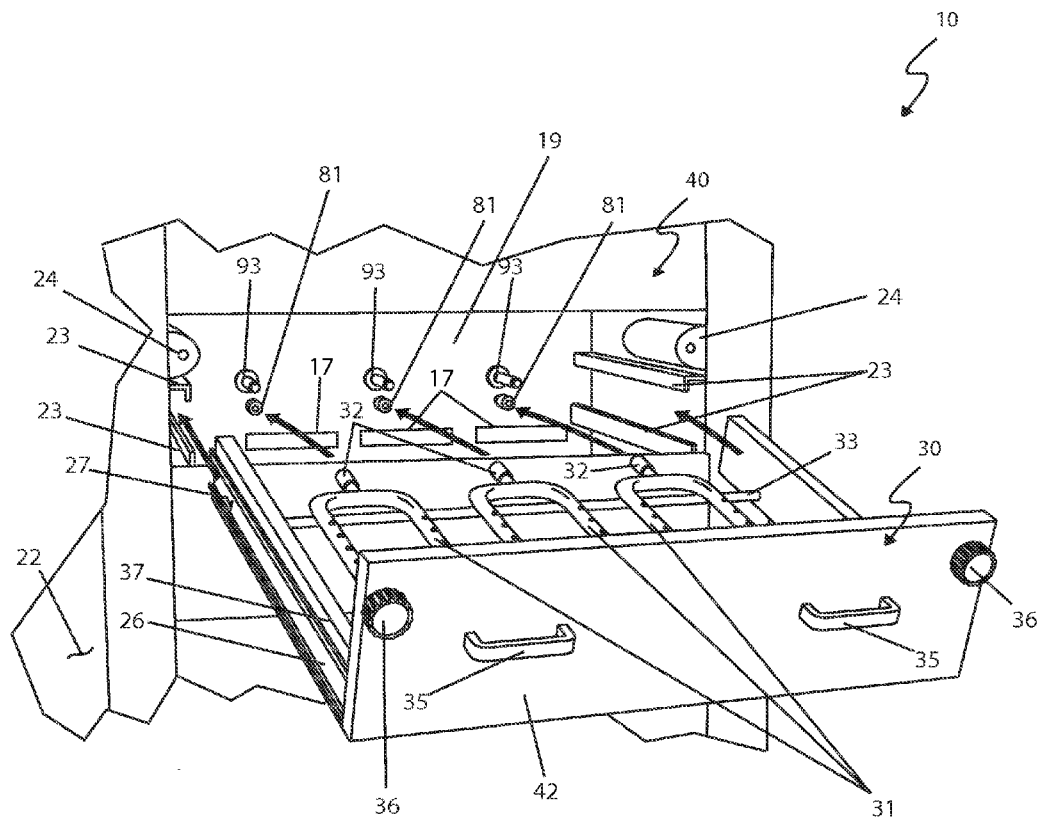
FIG. 2 is a front perspective view of a lower burner assembly portion 30 of the a residential flame broiler 10, according to the preferred embodiment of the present invention.

Located directly above the grill surface assembly 40 is the upper burner assembly 50 which is envisioned to provide similar function and construction as the aforementioned lower burner assembly 30 (see FIG. 2). The upper burner assembly 50 works in conjunction a reflector shield 51 to reflect radiant heat from the upper burner assembly 50 in a downward direction. Control of a flow of gas to the lower 30 and upper 50 burner assemblies as well as operation of an ignition means to are provided along a forward facing control panel 90 located subjacent thereto to the aforementioned drip tray assembly 60. The control panel 90 comprises six (6) gas control knobs 91, six (6) gas valves 95, and six (6) igniter buttons 94. The igniter buttons are each in electrical communication via an igniter wire 92 with an igniter 93 located on a rear panel 19. The gas control knobs 91 allow manual selection of gas flow to the burner loop 31. Said gas control knob 91 is in mechanical communication a panel mounted gas valve 95 comprising a conventional proportional vale unit controlling a flow of gas thereto a network of gas plumbing (see FIG. 3). Additionally, a high heat setting on the gas control knob 91 would allow the apparatus 10 to perform a self-cleaning process. A top warmer assembly 100 is provided at the top of the apparatus 10 to provide access to a grill area for toasting or warming of buns or for holding food stuffs 200 that has already been cooked by the apparatus 10. The top warmer assembly 100 further comprises a top warmer lid 101, an open top warmer grate 102, and expected accessing features including a second handle 103 and a pair of second hinges 104 along a rear edge, thereby providing convenient hinged front access to an interior space. The warmer grate 102 comprises similar materials and construction as the aforementioned grill grate 41, thereby exposing contained food, buns, and the like to heat raising from an interior space of the apparatus 10. An exhaust assembly 110 is provided on the top of the frame enclosure 15 to aid in carrying away the smoke generated by the operation of the apparatus 10. The exhaust assembly 110 comprises a 110-volt power fan 111, a stack 112, a stack hood 113, a plenum 114, a filter 115, a third handle 116, and a power cord 117. In such a manner smoke is permitted to exhaust via the powered fan 111 above the height of a typical user and will thus not be present in the user's face. The plenum 114 facilitates an interior space containing the fan assembly 111 and the filter 115. The powered fan 111 propels air from an interior space of the apparatus 10 upwardly through the filter 115 and through the stack 112. The filter 115 provides removal of airborne grease and oil by utilizing a woven metal mesh filter element designed to propagate condensation of said grease and oil. The filter 115 comprises a third handle 116 along a side surface allowing periodic removal and cleaning. The stack 112 comprises a tubular pipe section approximately six (6) inches in diameter and approximately one (1) to two (2) feet tall having a top mounted weather stack hood 113 which prevents entry of foreign matter into the vent stack 112. The frame enclosure 15 sits upon a storage compartment 70 which is accessed by a set of storage compartment doors 73. Each storage compartment door 73 comprises normal and expected features such as a second handle 71 and a pair of first hinges 72. The area directly behind the storage compartment doors 73 would be used for storage of barbecuing tools, supplies, food preparation aids, food, and similar items. The entire apparatus 10 including the storage compartment 70 is supported by four (4) heavy-duty lockable casters 25 being located at each bottom corner. To aid in usage of the apparatus 10, an auxiliary surface area 120, supported by a pair of collapsible support brackets 121 is provided along the frame side panel of the frame enclosure 15 and attached thereto via a pair of third hinges 122. The auxiliary surface 120 further comprises a plurality of hooks 127 along an outer edge region for hanging utensils, towels, and the like. The configuration and retractable nature of the auxiliary surface 120 is well known in the art and is similar to that found on conventional backyard barbecue grills.

The apparatus 10 is illustrated here in a preferred embodiment comprising a gas fuel source; however, it is understood that both electrical power as well as gas fuel may be incorporated in the apparatus 10 while providing equal benefit to a user and as such should not be interpreted as a limiting factor of the present invention 10.

An alternate embodiment of the apparatus 10 comprises the use of charcoal within the drip tray assembly 60 for cooking food stuffs 200 in lieu of the aforementioned gas source or within an alternate fuel tray substantially similar in structure as the grill tray assembly 40. Furthermore, additional sliding vents 17 are envisioned to be added to a rear surface 19 of the frame enclosure 15 to enable normal combustion of said charcoal.

Referring now to FIG. 2, a front perspective view of a lower burner assembly portion 30 of the apparatus 10, according to the preferred embodiment of the present invention, is disclosed. The lower burner assembly 30 and upper burner assembly 50 comprises three (3) burner loops 31, a male gas connector 32, a pair of lower burner support rods 33, and a burner face plate 34. The lower burner assembly 30 is illustrated here having a preferred number of three (3) cooking zones occupying left-side, middle, and right-side areas, respectively; however, said lower burner assembly 30 may comprise a varying number of burner loops 31 and corresponding heating zones based upon particular cooking requirements or a user's preference. The upper burner assembly 50 comprises a similar structure. In such a manner, even heat is provided throughout the apparatus 10 and no cold spots would be present. The lower burner assembly 30 and upper burner assembly 50 provides a means of attachment and detachment from the apparatus 10 for purpose of cleaning, maintenance, and replacement of via mechanical connection thereto. Engagement to a network of gas piping 83 along the frame enclosure 15 is provided via insertion of matched pairs of quick-disconnect male gas connectors 32 and female gas connectors 81. As the lower 30 and upper 50 burner assemblies are slid in and out of the apparatus 10, the female 23 and male 26 track features pre-align said male 32 and female 81 gas connectors, thereby establishing a sealed connection therebetween. The male 32 and female 81 gas connectors comprise commercially available gas fittings designed for non-pressurized gas line junctions and comprise internal "O"-ring seals. The burner face plate 34 provides an attachment means to the frame enclosure 15 via a pair of threaded knurled knobs 36 and corresponding threaded receivers 24 affixed to the frame enclosure 15. Said threaded knurled knobs 36 and corresponding threaded receivers 24 provide a limiting means to removal of the lower burner assembly 30 and upper burner assembly 50, thereby avoiding accidental disconnection of the male gas connectors 32 and female gas connectors 81. The track feature portions 23, 26 of the track mechanism allow for complete extension of each assembly 30, 40, 50, 60 outwardly from the frame enclosure 15 for purposes of cleaning, food insertion, food removal, maintenance, and interchanging thereof. Furthermore, the track mechanism provides a means for each assembly 30, 40, 50, 60 to be completely separated and lifted free of the frame enclosure 15. Each sliding track mechanism is similar to conventional heavy-duty or industrial drawer tracks providing expected features such as ball-bearing tracks and a locking mechanism 27 to prevent inadvertent over extension of said assemblies 30, 40, 50, 60 and falling thereof. The sliding track mechanisms 23 comprise a design and material selection that would be tolerant of the high temperatures required.

Figure 3:
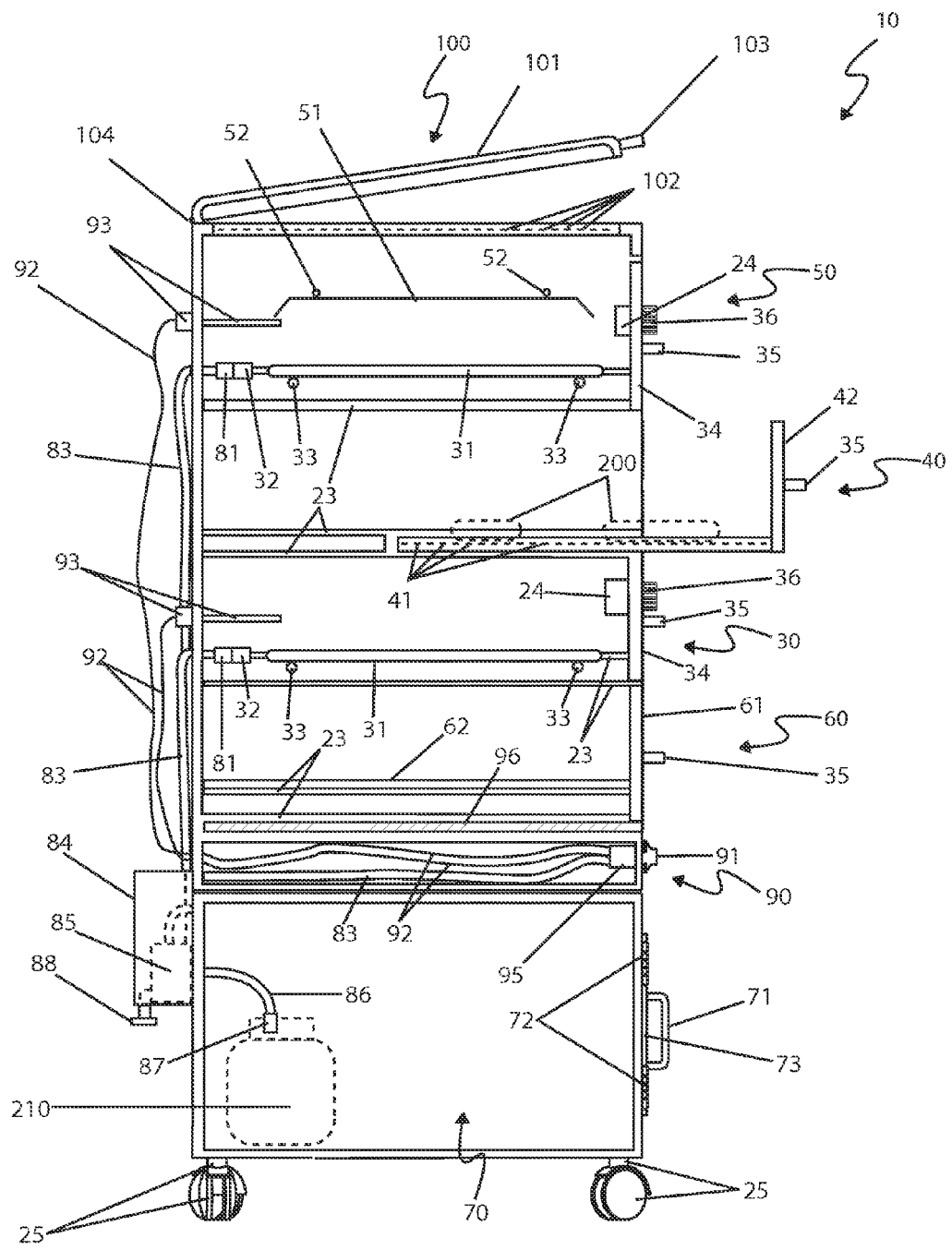
FIG. 3 is a section view taken along section A-A (see FIG. 1) of the residential flame broiler 10, according to the preferred embodiment of the present invention.

Referring now to FIG. 3, a section view taken along section A-A (see FIG. 1) of the residential flame broiler 10, according to the preferred embodiment of the present invention, is disclosed. The upper burner assembly 50 works in conjunction therewith a reflector shield 51 positioned directly above the upper burner assembly 50. The reflector shield 51 comprises a polished reflective metal surface providing an effective reflector of radiant heat from the upper burner assembly 50 in a downward direction toward food stuffs 200 upon the aforementioned grill grate 41. The reflector shield 51 is stationarily mounted to opposing side frame panels 22 of the frame enclosure 15 via a pair of reflector support rods 52 welded to a top surface of said reflector shield 51 and inner surfaces of said side frame panels 22. The apparatus 10 provides multiple fuel type capability via a gas manifold 84 which comprises plumbing and control components necessary to switch from domestic natural gas to standard purchased propane fuel tank 210. The aforementioned gas piping 83 from the gas valves 95 and gas burner loops 31 is routed to said gas manifold 84 and a gas regulator 85 which comprises respective propane fuel hose 86 and propane tank connector 87 as well as a natural gas connector 88. The apparatus 10 allows a user to establish a connection to conventional natural gas source or to a portable propane tank 210 which may be stored within the storage compartment 70 and accessed through a propane tank access door 124 having a fourth handle 125 and located along a lower side portion thereof and attached via fourth hinges 125 thereto.

Figure 4A:
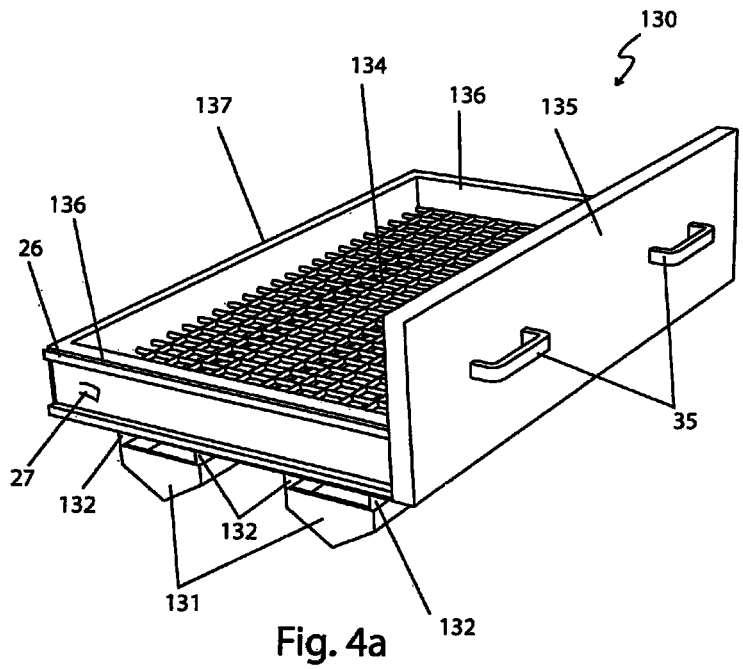
FIG. 4a is a front perspective view of a smoker assembly portion 130 of the residential flame broiler 10, according to the preferred embodiment of the present invention.
Figure 4B:
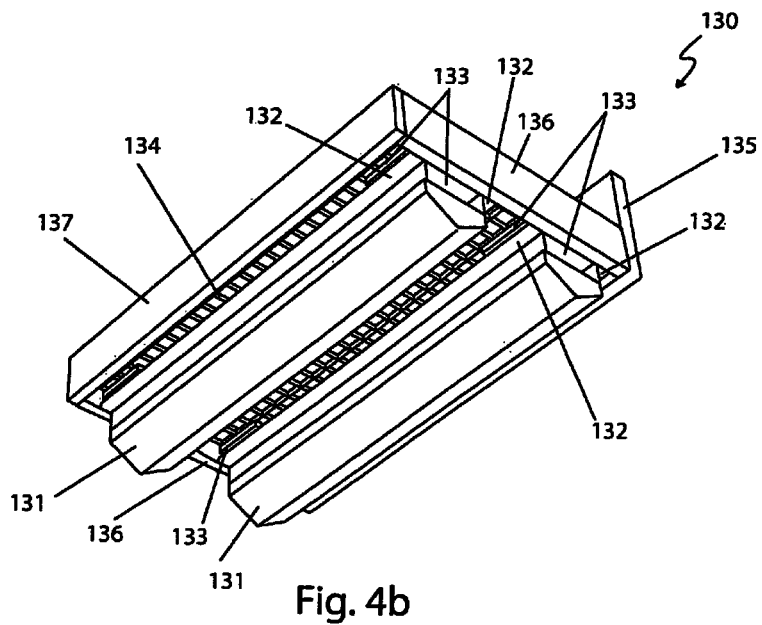
FIG. 4b is a bottom perspective view of a smoker assembly portion 130 of the residential flame broiler 10, according to the preferred embodiment of the present invention; and, FIG. 5 is a front perspective view of a drip tray assembly portion 60 of the residential flame broiler 10, according to the preferred embodiment of the present invention.

Referring now to FIGS. 4a and 4b, front perspective views of a smoker assembly portion 130 of the apparatus 10, according to the preferred embodiment of the present invention, is disclosed. The smoker assembly 130 provides a means to hold dry or water-soaked wood chips for the purposes of smoking food. The smoker assembly 130 is designed to be installed within any one (1) of the drawer openings, but preferably in place of the grill surface assembly 40, thereby configuring the apparatus 10 for smoking food. The smoker assembly 130 comprises similar materials and construction as the aforementioned grill surface assembly 40, such as a pair of male track features each affixed to a pair of side panels and having a locking mechanism thereon and further comprising enhancements which are affixed to bottom portions. The smoker assembly 130 further comprises a pair of wood/water trays 131, four (4) hanging brackets 132, four (4) support plates 133, a smoker grate 134, a smoker face plate 135, a pair of smoker side panels 136, and a smoker rear panel 137. The smoker side panels 136 provide an attachment to the four (4) support plates 133 forming pairs of and being located at opposing locations along said smoker side panels 136. Each opposing pair of support plates 133 provides a sliding attachment to a wood/water tray 131 via a pair of "L"-shaped hanging brackets 132 extending between to support the wood/water tray 131. In use, a user prepares one (1) or both wood/water trays 131, opens the smoker assembly 130, and slides the wood/water trays 131 into the hanging brackets 132 in a side-to-side direction. Additionally, said smoker trays 131 may be filled with water, thereby enabling a user to provide steaming of various food stuffs 200.

Figure 5:
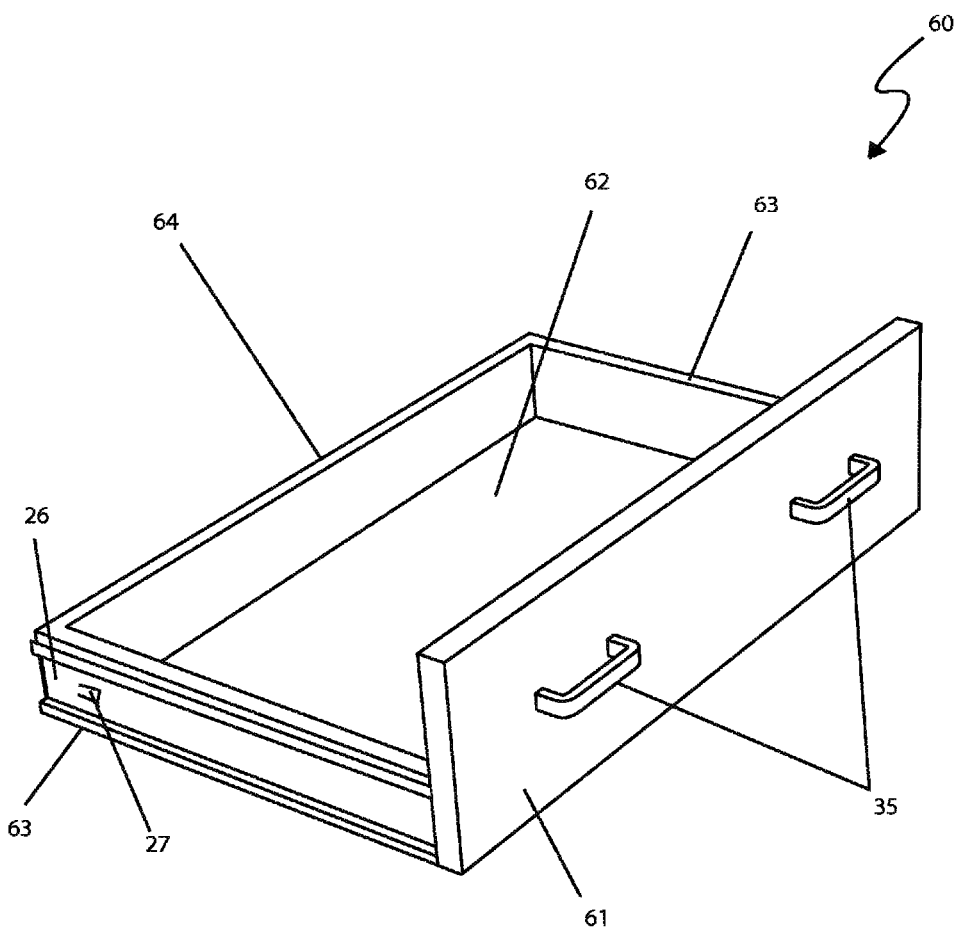

Referring finally to FIG. 5, a front perspective view of a drip tray assembly portion 60 of the apparatus 10, according to the preferred embodiment of the present invention, is disclosed. The drip tray assembly 60 is located in the bottom-most position of the apparatus 10. The drip tray assembly 60 provides a receiver means thereto grease, oil and other discarded substances from the lower burner assembly 30, grill surface assembly 40, and upper burner assembly 50. The drip tray assembly 60 further comprises a drip tray face plate 61, a removable flat drip tray 62, a pair of drip tray side panels 63, and a drip tray rear panel 64. It is envisioned that the drip tray portion 62 may be covered with an aluminum fill lining, thereby providing quick removal of caught grease and oil.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A cooking apparatus for cooking foodstuffs comprising:
    a base unit, further comprising:
        a generally upright rectangular frame comprising a cooking interior, a pair of opposing side panels, a top panel, a rear panel comprising a plurality of adjustable ventilation slots, and a front panel framing said cooking interior;
        an exhaust assembly located on a rear portion of said top panel and in fluid communication with said cooking interior, further comprising:
            a plenum affixed to said top panel providing a venting means for said cooking interior and comprising a filter housing;
            a filter removably located in said filter housing, comprising a handle on an outer end thereof;
            a fan assembly comprising a motorized fan housed in a fan housing suprajacent to said filter and affixed to said plenum at a lower end;
            a stack affixed at a lower end to an upper end of said fan assembly; and,
            a stack hood affixed to a top end of said stack;
        a storage compartment subjacent and affixed to said cooking interior;
        a fuel tank supporting means in said storage compartment configured to support a fuel tank;
        a pair of latching receivers affixed to opposing interior side walls of said front panel; and,
        a pair of female track features affixed to opposing interior side walls of said side panels subjacent to said pair of latching receivers;
    a plurality of burner unit assemblies insertable and securable into said base unit;
    a burner control assembly adapted to be in fluid communication with said fuel tank and said plurality of burner unit assemblies for controlling transmission of fuel to said plurality of burner unit assemblies; and,
    a grill tray assembly insertable and securable into said cooking interior; and,
    a reflector shield mounted to opposing interior side walls of said side panels at an upper portion of said cooking interior;
    wherein said apparatus is fabricated out of materials able to withstand elevated temperatures associated with cooking;
    wherein said cooking apparatus provides a self-contained cooking means;
    wherein said pair of latching receivers provide a latching means to each of said plurality of burner unit assemblies and said grill tray assembly;
    wherein said pair of female track features provides a sliding mechanism means to each of said plurality of burner unit assemblies and said grill tray assembly;
    wherein said stack hood provides a covering means to said stack for protecting said fan assembly, said filter, and said cooking interior from external elements;
    wherein said motorized fan is adapted to receive power from a conventional power source through a power cord;
    wherein said reflector shield reflects radiant heat back into said cooking interior;
    wherein said plurality of burner unit assemblies and said grill tray assembly are arranged in a vertical drawer configuration; and,
    wherein said cooking apparatus reduces exposure to a user of smoke, heat, and drippings that emanate from said apparatus when in use.

2. The cooking apparatus of claim 1, wherein said burner control assembly further comprises:
    a first fuel tank hose with a fuel tank connector adapted to be removably connected to said fuel tank at a connector end;
    a gas distribution manifold removably connected to a manifold end of said first fuel tank hose;
    a second fuel tank hose removably connected to said gas distribution manifold at a manifold outlet end thereof;
    at least one (1) set of fuel control knobs located at a front surface of said front panel, subjacent to said cooking interior, and removably connected to said second fuel tank hose at a control end;
    at least one (1) burner fuel hose removably connected to said at least one (1) fuel control knob at a control end;
    at least one (1) set of female burner connectors located at said rear panel and removably connected to said at least one (1) burner fuel hose at a distribution end;
    at least one (1) igniter located at said rear panel and directed inwardly adjacent to said at least one (1) set of female burner connectors; and,
    at least one (1) igniter control located on said front panel;
    wherein said first fuel hose is adapted to be in fluid communication with said fuel tank;
    wherein said gas distribution manifold is in fluid communication with said first fuel tank hose;
    wherein said second fuel tank hose is in fluid communication with said gas distribution manifold;
    wherein said at least one (1) fuel control knob is in fluid communication with said second fuel tank hose and controls an amount of fuel transmitted to said plurality of burner unit assemblies;

wherein said at least one (1) burner fuel hose is in fluid communication with said at least one (1) fuel control knob;
wherein an insulating barrier is maintained between said cooking interior and said burner control assembly; and,
wherein said igniter provides an igniting spark to said apparatus.

3. The cooking apparatus of claim 2, wherein said plurality of burner unit assemblies each comprise:
a burner unit, comprising at least one (1) burner zone with a male burner connector;
a frame assembly framing said burner unit, further comprising:
a pair of burner side panels;
a face plate affixed to front ends of said pair of burner side panels;
a pair of handles attached to a front surface of said face plate;
a pair of knurled knobs threadably attached to said pair of latching receivers; and,
a support rod affixed to said pair of burner side panels at opposing side walls thereof; and,
a pair of male track features each affixed to said pair of burner side panels and having a locking mechanism thereon;
wherein one (1) of said plurality of burner unit assemblies is insertable in one (1) of said drawer openings;
wherein said plurality of burner unit assemblies are adapted to be in fluid communication with said fuel tank when said plurality of burner unit assemblies are connected to said apparatus;
wherein said burner unit is controlled by said burner control assembly; and,
wherein said locking mechanism prevents unwanted complete removal of said burner unit from said cooking apparatus.

4. The cooking apparatus of claim 3, wherein said grill tray assembly comprises:
a grill grate;
a frame assembly framing said grill grate, further comprising:
a pair of grill tray side panels;
a grill tray face plate affixed to front ends of said pair of grill tray side panels;
a pair of grill tray handles attached to a front surface of said grill tray face plate; and,
a rear panel affixed to rear ends of said pair of grill tray side panels; and,
a pair of grill tray male track features each affixed to said pair of grill tray side panels and having a grill tray locking mechanism thereon;
wherein said grill tray assembly is insertable in one (1) of said drawer openings;
wherein said grill tray assembly provides a cooking surface for foodstuffs; and,
wherein said grill tray locking mechanism prevents unwanted complete removal of said grill tray assembly from said cooking apparatus.

5. The cooking apparatus of claim 4, further comprising a drip tray assembly comprising:
a drip tray;
a frame assembly framing said drip tray, further comprising:
a pair of drip tray side panels;
a drip tray face plate affixed to front ends of said pair of drip tray side panels;
a pair of drip tray handles attached to a front surface of said drip tray face plate; and,
a rear panel affixed to rear ends of said pair of drip tray side panels; and,
a pair of drip tray male track features each affixed to said pair of drip tray side panels and having a drip tray locking mechanism thereon;
wherein said drip tray assembly is insertable in one (1) of said drawer openings;
wherein said drip tray assembly captures and retains dropped food, grease, for subsequent removal; and,
wherein said drip tray locking mechanism prevents unwanted complete removal of said drip tray from said cooking apparatus.

6. The cooking apparatus of claim 5, wherein said burner unit comprises three (3) burner zones, each independently controlled by said burner control assembly.

7. The cooking apparatus of claim 6, wherein said plurality of burner unit assemblies, said grill tray assembly, and said drip tray are interchangeable therein any desired drawer openings of said apparatus.

8. The cooking apparatus of claim 7, wherein said storage compartment further comprises:
a pair of storage compartment doors hingedly attached on a front surface of said storage compartment for access thereto;
a fuel tank access door hingedly attached on a side surface of said storage compartment and adapted for providing access to said fuel tank; and,
a set of casters and wheel assemblies located at each corner of said storage compartment bottom surface;
wherein said set of casters and wheel assemblies comprise a heavy-duty rating and a resiliency for supporting and transporting said apparatus.

9. The cooking apparatus of claim 8, wherein said base unit further comprises:
an auxiliary surface hingedly attached at a proximal end to a frame side panel of said base unit and to a pair of side brackets at a distal end thereof;
wherein said pair of side brackets are hingedly attached to one of said frame side panels and pivotally attached to an under surface of said auxiliary surface, thereby enabling said auxiliary surface to pivot upward from a resting state to a deployed state; and,
wherein said deployed state provides a stable and level surface.

10. The cooking apparatus of claim 9, wherein said auxiliary surface further comprises a plurality of hooks for retaining a plurality of cooking utensils.

11. The cooking apparatus of claim 8, wherein said base unit further comprises a top warmer assembly located on a top panel opposite said exhaust assembly and further comprising:
a domed lid hinged at a rear end and comprising a handle at a front end;
a top warmer grate removably located in said top panel;
wherein said top warmer assembly utilizes ambient and radiant heat from said apparatus to provide a warm cooking environment to foodstuffs placed upon said top warmer grate.

12. The cooking apparatus of claim 8, wherein said filter comprises a metal mesh construction.

13. The cooking apparatus of claim 8, further comprising a smoker tray assembly comprising:
a grill grate;
a frame assembly framing said grill grate, further comprising:
a pair of smoker tray side panels;

a smoker tray face plate affixed to front ends of said pair of smoker tray side panels;

a pair of smoker tray handles attached to a front surface of said smoker tray face plate;

a rear panel affixed to rear ends of said pair of smoker tray side panels; and, a pair of smokers attachable to a lower surface of said grill grate, further comprising:

two (2) support plates located at opposing locations on an underneath surface of said grill grate and attachable to an opposing pair of smoker tray side panels;

two (2) hanging brackets removably attached to said pair of said support plates;

smoker trays depending downward from said hanging brackets a pair of smoker tray male track features each affixed to said pair of smoker tray side panels and having a smoker tray locking mechanism thereon;

wherein said smoker tray assembly is insertable in one (1) of said drawer openings;

wherein said smoker tray assembly provides a means for retaining wet or dry smoking materials for foodstuffs placed on said grill grate; and, wherein said smoker tray locking mechanism prevents unwanted complete removal of said smoker tray assembly from said cooking apparatus.

14. The cooking apparatus of claim 8, further comprising an alternate fuel tray comprising:

an alternate fuel grate;

a frame assembly framing said alternate fuel grate, further comprising:

a pair of fuel tray side panels;

a fuel tray face plate affixed to front ends of said pair of fuel tray side panels; and, a pair of fuel tray handles attached to a front surface of said fuel tray face plate; and, a pair of fuel tray male track features each affixed to said pair of fuel tray side panels and having a fuel tray locking mechanism thereon;

wherein said alternate fuel tray is insertable in one (1) of said drawer openings;

wherein said alternate fuel tray provides a means of supporting an alternate fuel source; and, wherein said fuel tray locking mechanism prevents unwanted complete removal of said alternate fuel tray from said cooking apparatus.

15. The cooking apparatus of claim 8, wherein said apparatus comprises a means to utilize an auxiliary fuel source, further comprising:

an auxiliary fuel source connector adapted to be removably connected to said auxiliary fuel source;

a first auxiliary fuel hose adapted to be removably connected to said auxiliary fuel source at a connector end;

a fuel regulator connected to said first auxiliary fuel hose at a regulator end; and, a second auxiliary fuel hose connected to said gas distribution manifold at a manifold end;

wherein said first auxiliary fuel hose is adapted to be in fluid communication with said auxiliary fuel source;

wherein said fuel regulator is in fluid communication with said first auxiliary fuel hose;

wherein said fuel regulator regulates a flow of said auxiliary fuel source to said apparatus;

wherein said second auxiliary fuel hose is in fluid communication with said fuel regulator; and, wherein said gas distribution manifold is in fluid communication with said second auxiliary fuel hose.

16. The cooking assembly of claim 8, wherein said drip tray also performs as a water steamer.

* * * * *